United States Patent [19]

Stampfli

[11] 3,842,860

[45] Oct. 22, 1974

[54] THREE-WAY VALVE FOR FLUIDS

[75] Inventor: Harald Stampfli, Geneva, Switzerland

[73] Assignee: Lucifer S.A., Carouge-Geneva, Switzerland

[22] Filed: Mar. 29, 1973

[21] Appl. No.: 345,851

[30] Foreign Application Priority Data
Apr. 4, 1972   Switzerland.................... 4886/72

[52] U.S. Cl............................. 137/596.17, 251/137
[51] Int. Cl............................................ F15b 13/044
[58] Field of Search................... 137/596.17, 625.65; 251/137, 139

[56] References Cited
UNITED STATES PATENTS

| | | | |
|---|---|---|---|
| 2,322,911 | 6/1943 | Beam | 251/137 X |
| 2,366,412 | 1/1945 | Lambert | 251/137 |
| 2,614,584 | 10/1952 | Goepfrich | 251/139 |
| 3,534,772 | 10/1970 | Stampfli et al. | 137/625.65 X |
| 3,542,333 | 11/1970 | Stampfli | 251/139 X |
| 3,565,111 | 2/1971 | Pearson | 137/596.17 |

FOREIGN PATENTS OR APPLICATIONS

| | | | |
|---|---|---|---|
| 575,440 | 2/1946 | Great Britain | 137/596.17 |
| 1,179,068 | 10/1964 | Germany | 137/625.65 |

*Primary Examiner*—William R. Cline
*Assistant Examiner*—Gerald A. Michalsky
*Attorney, Agent, or Firm*—Emory L. Groff; Emory L. Groff, Jr.

[57] ABSTRACT

A three-way valve adapted to control for instance a main valve and comprising inside a common tubular member two sliding magnetic cores carrying valve members adapted to close the connection at the corresponding ends of the tubular member between the input and the exhaust respectively and the output feeding the control chamber of the main valve. The operation is controlled by the selective energization of two windings surrounding the tubular member in registry with the corresponding cores and separated by a transverse ferromagnetic disc provided with an opening ensuring a free passageway through the tubular member, said disc forming part of each magnetic circuit cooperating with the magnetic cores.

4 Claims, 1 Drawing Figure

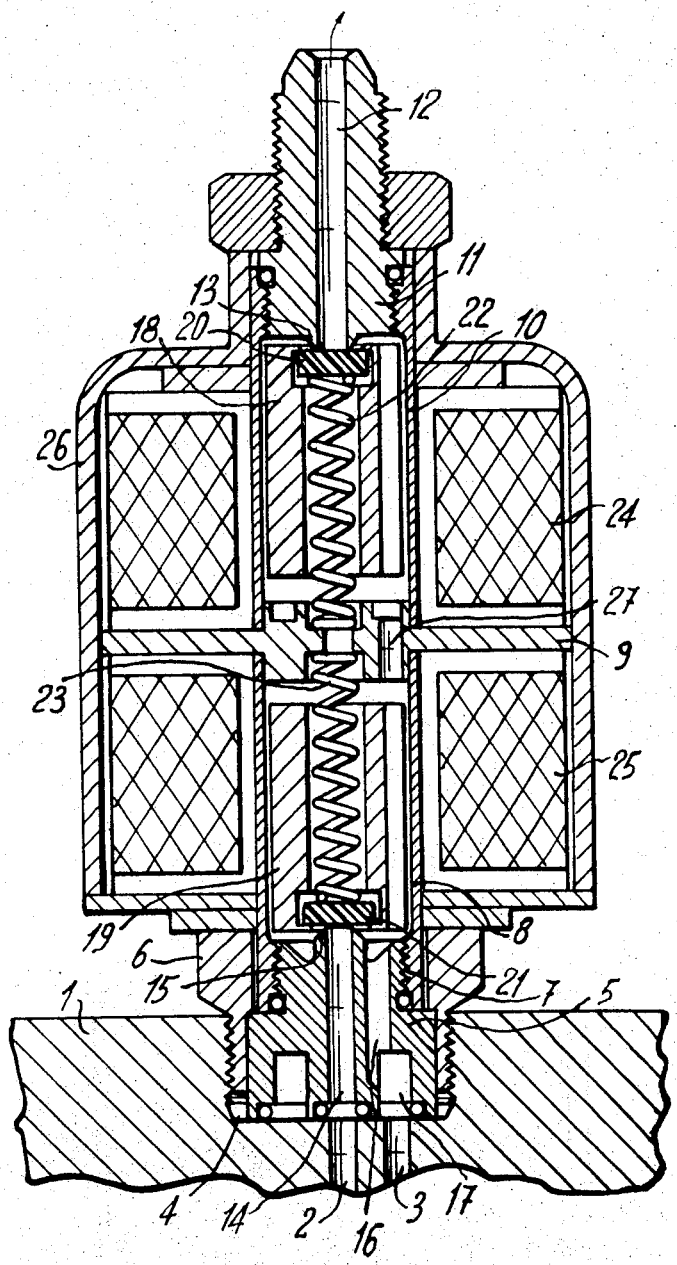

THREE-WAY VALVE FOR FLUIDS

The present invention relates to a three-way valve for fluid. Among the numerous types of electromagnetically controlled three-way valves, there are those which are adapted to control, by means of electric pulses, the position of a main valve member. The movable armature of the control valves is then held fast in either of its extreme positions. For one of said positions, the input of the control fluid remains connected with the control chamber of the main valve member. The maintenance of the latter in the corresponding position is thus unreliable if the pressure of the control fluid happens to sink transiently.

Arrangements controlling the position of the main valve member are also known, which resort to two independent valves providing two control channels controlled by electromagnetic pulses. However, such arrangements including two control valves are bulky and expensive and require electric connections for each valve.

The present invention has for its object a particularly simple structure incorporating a three-way valve which eliminates the drawbacks of prior known systems.

The valve according to the invention includes a central tube inside of which are slidingly fitted two cores each carrying a valve member on its side facing outwardly of the tube, said cores being separated from each other by a ferromagnetic member provided with at least one opening for the passage of the fluid to be controlled, while a seat provided at each end of the tube is adapted to be closed by the valve member on the adjacent core and each core is surrounded by an electric winding producing a magnetic field controlling the movements of the particular core, one passageway for the fluid opening into the tube between the two seats thereon.

The single FIGURE of the accompanying drawing is a diagrammatic cross-section of one embodiment of the improved valve.

The valve illustrated is an auxiliary valve controlling a main valve of which merely a portion of the outer casing 1 is shown. Two bores provided at 2, 3 in said outer casing open into the bottom of a recess 4 in the outer surface of the latter. The bore 2 is fed by a supply of fluid under pressure whereas the bore 3 leads to the chamber enclosing the member controlling the main valve.

The recess 4 is provided for housing an axially bored member 5 held within said recess by a threaded fastening ring 6 engaging a tapping in the recess 4, and provided with an inner shoulder extending over the periphery of the upper surface of said member 5. The latter includes an upper extension 7 threadedly engaging the lower end of the lower section 8 of the central tube, the upper end of which is secured to a ferromagnetic disc-shaped member 9 carrying the upper section 10 of the central tube. The upper end of said upper section is tapped so as to threadedly engage the closing member 11 provided with an axial exhaust bore 12 surrounded by a downwardly projecting seat 13.

The axial bore 14 in the member 5 leads to a seat 15 while said member 5 is provided with a further eccentric bore 16 parallel with the axial bore 14 and the lower end of which opens into an annular groove 17.

The two tube sections 8 and 10 are made of a nonmagnetic material and form together the complete central tube enclosing two tubular magnetic cores 18 and 19 located on the opposite sides of the ferromagnetic disc 9. Each of said cores 18 and 19 is provided with a chamber in which a valve member, 20 or 21, is held with some degree of clearance.

The longitudinal bore in each of said cores houses a spring shown respectively at 22 and 23, and held fast between the ferromagnetic disc 9 and the valve member in the chamber formed in the corresponding core.

The tube formed by the two sections 8 and 10 is surrounded by two electric windings 24 arranged in superposed coaxial relationship and each controlling the motion of the corresponding core 18 or 19. Both windings 24, 25 are covered by a cap 26 made of ferromagnetic material, said cap forming part of the magnetic circuits associated with cores 18 and 19.

It is sufficient for the control of the member controlling the main valve, to send a pulse of a sufficient duration into either of the windings 24 and 25. The energization of the winding 25 produces a shifting of the core 19 against the pressure of its spring 23, which causes the valve member 21 to move off its seat 15. In such a position, the bore 2 feeding fluid under pressure communicates through the seat 15, the eccentric bore 16 and the groove 17 with the bore 3 leading to the chamber enclosing the member controlling the main valve. After the end of the energization of the winding 25, the core 19 returns into the illustrated position, so that the fluid under pressure remains within the control chamber of the main valve, independently of possible variations of the supply pressure.

In order to thereafter allow the fluid under pressure in the bore 3 to be exhausted, the winding 24 is energized, whereby the core 18 is shifted and uncovers the seat 13. Consequently, the bore 3 in the casing communicates with the exhaust bore 12 through the annular groove 17, the eccentric bore 16, the axial bore in the tubular section 8, an opening 27 through the disc 9 and the axial bore in the tube section 10.

In the case where the controlling fluid is compressed air, the exhaust bore 12 in the closing member 11 opens into the circumambient atmosphere. If a liquid or a gas which have to be collected are used, the closing member 11 should of course be connected with recovering means.

I claim:

1. A three-way valve within an enclosure and adapted to control a further mechanism through an output channel fed with an operative fluid through an input channel or connected with an exhaust channel, said valve comprising a central tubular member, an axially bored closure member at each end of the opposite ends of said tubular member, each said closure member provided with a seat at its inner end, the bore in one of said closure members comprising said exhaust channel, the bore in the other of said closure members communicating with said input channel, a single ferromagnetic disc extending across and out of the tubular member and provided with an opening permanently ensuring the passage of the fluid through the tubular member, two magnetic cores slidably fitted inside the tubular member on the corresponding sides of the ferromagnetic disc, a valve member carried by each core on the side thereof facing outwardly, said valve members adapted to selectively close the corresponding seats with reference to the output channel, two electric windings surrounding the tubular member and in registry with the corresponding cores, each of said windings selectively producing a magnetic field through said ferromagnetic disc moving the corresponding valve out of operative contact with the related cooperating seat and a passageway for the fluid, said passageway opening into said tubular member between said two seats.

2. A valve as claimed in claim 1, comprising two springs engaging respectively the opposite surfaces of the ferromagnetic disc within the tubular member and urging the corresponding valve members against the cooperating seats.

3. A valve as claimed in claim 1, wherein each core is provided in its outwardly facing side with a recess housing the corresponding valve member with a clearance and with an axial bore opening into said recess, said valve further comprising two springs engaging respectively the opposite surfaces of the ferromagnetic disc and extending within the axial bores of the corresponding cores to urge the corresponding valve members against the cooperating seats.

4. A valve as claimed in claim 1 wherein, said ferromagnetic disc is formed with a single peripheral pole-piece separating the two electric windings, said windings being in a coaxial aligned relationship.

* * * * *